(12) United States Patent
Minamino

(10) Patent No.: US 6,204,934 B1
(45) Date of Patent: Mar. 20, 2001

(54) IMAGE PROCESSING DEVICE AND IMAGE PROCESSING METHOD

(75) Inventor: Katsushi Minamino, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/126,306

(22) Filed: Jul. 30, 1998

(30) Foreign Application Priority Data

Aug. 12, 1997 (JP) .................................................. 9-217419

(51) Int. Cl.[7] ...................................................... H04N 1/52
(52) U.S. Cl. ........................................... 358/1.9; 358/535
(58) Field of Search .................................. 358/456, 457, 358/462, 520, 534, 535, 536, 1.9, 466, 298; 382/237, 270, 176

(56) References Cited

U.S. PATENT DOCUMENTS

| 4,710,822 | * | 12/1987 | Matsunawa | 382/172 |
| 5,029,017 | * | 7/1991 | Abe et al. | 358/451 |
| 5,153,576 | * | 10/1992 | Harrington | 345/149 |
| 5,822,451 | * | 10/1998 | Spaulding et al. | 382/162 |

* cited by examiner

*Primary Examiner*—Scott Rogers
(74) *Attorney, Agent, or Firm*—Hogan & Hartson, LLP

(57) ABSTRACT

When a color image is converted to binary format using a dither pattern, a plurality of dither patterns are first prepared. Then, saturation and hue of the original image are used as parameters in selecting the most appropriate dithering pattern among a plurality of candidates. Therefore, even if the lightness of two original images is the same, these images are converted to different black-and-white images as long as their saturation and hue are different. Such black-and-white images look naturally when compared with the original color images.

15 Claims, 5 Drawing Sheets

FIG. 2A

| 4/16 | 11/16 | 8/16 |
|---|---|---|
| 7/16 | 6/16 | 1/16 | 14/16 |
| 10/16 | 3/16 | 1/16 | 7/16 |
| 6/16 | 9/16 | 15/16 | 8/16 |

Dm

4 × 4 MATRIX OF INDIVIDUAL PIXEL DATA

FIG. 2B

| 1/16 | 9/16 | 3/16 | 11/16 |
|---|---|---|---|
| 13/16 | 5/16 | 15/16 | 7/16 |
| 4/16 | 12/16 | 2/16 | 10/16 |
| 16/16 | 8/16 | 14/16 | 6/16 |

P1

BAYER DITHERING PATTERN

FIG. 2C

| 1 | 0 | 1 | 0 |
|---|---|---|---|
| 0 | 1 | 0 | 1 |
| 1 | 0 | 0 | 1 |
| 0 | 1 | 0 | 1 |

Dm1

MATRIX OF CONVERTED BINARY DATA

IMAGE PROCESSING DEVICE AND IMAGE PROCESSING METHOD

BACKGROUND OF THE INVENTION

1. Field of the Invention

The present invention relates to an image processing device and image processing method for converting a color image into a binary black and white image.

2. Description of the Related Art

Recently facsimile machines and copying machines (photocopiers) capable of scanning color images have been developed, and demand for these machines has increased along with the spread of high quality color printers and displays.

These image processing devices capable of processing color images utilize an optical color sensor to scan in an image in the three primary colors (RGB). However, if an associated printer or display is set to a black-and-white output mode or is not provided with a color output or display function, the scanned color image is converted to a black and white image based on lightness of the original color image.

FIG. 4 of the accompanying drawings illustrates processing steps used in such a conversion. Here, image data scanned-in in the three primary colors (RGB) is converted into multi-bit-depth color data according to L*a*b* color, one of the CIE (International Council on Illumination) standard model color systems, and then further converted to binary image data.

Referring to FIG. 4, the RGB image data scanned in by a scanner Sc is converted to CIE LAB color-system data using an RGB-Lab converter 100. Next, lightness L data (multiple bit-depth data) is converted to binary data B&W using a dithering unit 101, and output from a printer Pr. The dithering unit 101 has only one dither pattern. The values inside the parentheses indicate the bit number for each data.

The dithering process divides an image into a plurality of small areas, and changes the density of the black pixels in each area to provide an intermediary gray-scale image having a plurality of pixel density levels as a whole. Specifically, an area defined by n×n pixels (a dot matrix) is used as a unit of gradation (or an original image is divided into a plurality of matrices), and a dither pattern in which the threshold values between white and black are dispersed is applied to each matrix to obtain a binary image. In the dithering process, the lightness L of each pixel in the matrix is compared with a corresponding threshold value of the dither pattern; the pixel is converted to white if the lightness of the pixel is brighter than the threshold, and the pixel is converted to black if its lightness is darker than the threshold.

FIG. 5 of the accompanying drawings illustrates the color spacing according to the Lab color system. In the Lab color system, lightness is represented as L and chromaticity, showing hue and saturation, is represented as "a" and "b". Saturation "c" is given by $(a^2+b^2)^{0.5}$, and hue "h" is given by $\tan^{-1}(b/a)$. Further, in the color spacing of the Lab color system, "+a" represents red levels, "−a" represents the green level, "+b" represents the yellow level, and "−b" represents the blue level. As the color values extend to the limits of each range, the colors become more vivid, and as the values approach the center, the colors become softer.

In a conventional image processing system, even when the chromaticity "a", "b" of dot matrices in a single original image differ, the matrices are converted into the same bilevel black and white data as long as their lightness L is the same. Therefore, the black and white image that is output upon color-to-monochrome conversion can look unnatural in comparison to the original color image.

SUMMARY OF THE INVENTION

An object of the present invention is to propose an image processing device and image processing method which can produce a natural-looking black-and-white image from an original color image.

In order to accomplish this object, the present invention uses different dither patterns according to the hue and/or saturation of an original color image (pixels). Specifically, a plurality of dither patterns are prepared beforehand, and a single dither pattern is then selected based on the hue and/or saturation of the original color image. The lightness is not considered in selecting the dither pattern.

According to one aspect of the invention, there is provided an image processing machine that detects lightness, hue and/or saturation of an original color image, presents a plurality of dither patterns, selects a single dither pattern depending upon the hue and/or saturation of the color image and carries out the dither process (or binary conversion of color image) to the lightness using the selected dither pattern. For example, if an original color image is expressed numerically in the Lab color system, two dither patterns may temporarily be provided, and a single dither pattern is selected depending upon the saturation "c" ($c=(a^2+b^2)^{0.5}$). Consequently, the resulting black-and-white image does not appear unnatural when output. The black-and-white image may be output onto recording paper or shown on an LCD or CRT display. The plurality of dither patterns may be stored in a memory of the image processing device beforehand.

The present invention may be modified as follows: only when the lightness of a particular area in the target image is equivalent to that of a neighboring area, hue and/or saturation is used to select the dithering pattern. When the chromaticities of adjoining regions in an original image differ and the lightness remains the same, the eye perceives the difference. Thus when, for example, the total lightness of the pixels in the neighboring dot matrices are equal, the chromaticity (hue and/or saturation) of the image is considered in the selection of the dithering pattern. Particularly, the dither pattern selection depending upon the hue and/or saturation may be performed when the neighboring regions on the same scanning line have the same lightness.

BRIEF DESCRIPTION OF THE DRAWINGS

FIGS. 2A to 2C illustrate a dithering process (binary conversion process) applied to a relatively vivid color: specifically, FIG. 2A illustrates a dot matrix of original image, FIG. 2B illustrates a Bayer dither pattern and FIG. 2C illustrates a resulting binary data.

FIGS. 3A to 3C illustrate another dithering process which is applied to a relatively dark or soft color: specifically, FIG. 3A is a dot matrix, FIG. 3B is a vortex dither pattern and FIG. 3C is a resulting binary data.

DETAILED DESCRIPTION OF THE INVENTION

Embodiments of the present invention will now be described in reference to FIGS. 1 to 3C and 5 of the accompanying drawings.

Figure 1:
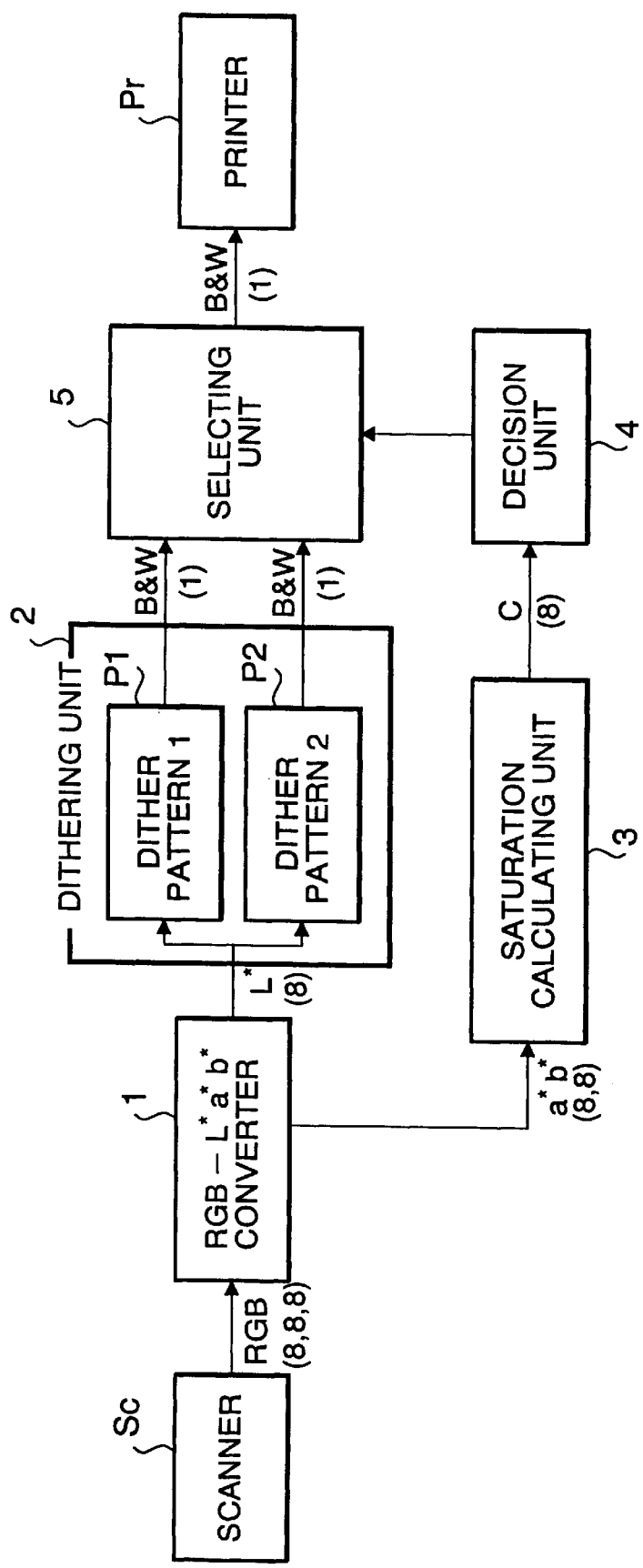
FIG. 1 illustrates a diagram outlining the flow of operations for binary conversion of an image in the image processing device of the present invention.

Referring to FIG. 1, illustrated is a block diagram of an image processing device of the present embodiment. This image processing device may be applied to facsimile machines, photocopiers and the like which converts a color image into a black-and-white image. The numbers in parentheses indicate the bit depth for each variable.

An original color image is scanned in by a scanner Sc and RGB data is output to an RGB-Lab converter 1 for conversion to Lab color data. Then, the RGB-Lab converter 1 outputs data having lightness L to a dithering unit 2 to provide two sets of binary data B&W. In this embodiment, two dither patterns P1, P2 are already prepared in the dithering unit 2. In the dithering unit 2, two dithering processes are performed using the two dither patterns P1, P2, respectively. The two sets of binary data B&W are output to a selecting unit 5.

Figure 5:
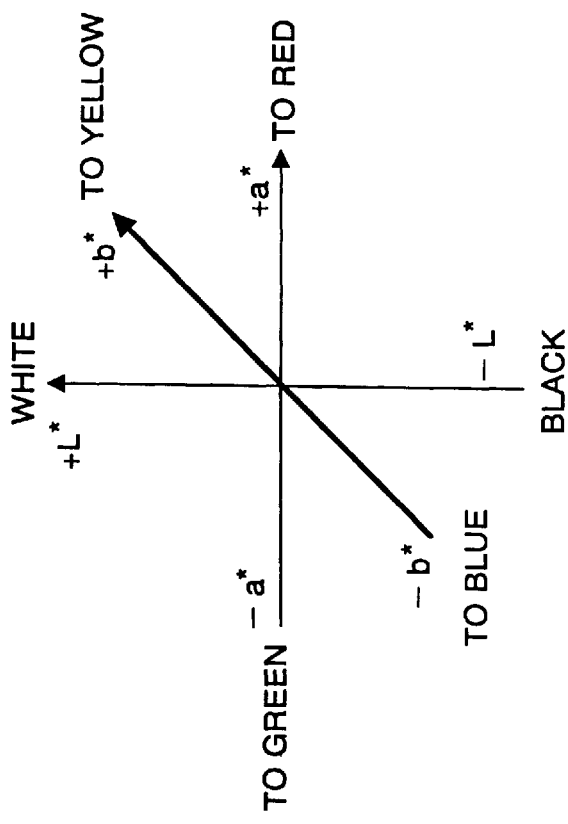
FIG. 5 is a diagram of the color space in the Lab color system.

In the meantime, the RGB-Lab converter 1 outputs data about "a" and "b" to a saturation calculating unit 3 which calculates the saturation "c" of the image according to the equation $c=(a^2+b^2)^{0.5}$ (see FIG. 5). A decision unit 4 compares the saturation "c" calculated by the saturation calculating unit 3 with the predetermined threshold value, and based upon this result, the selecting unit 5 selects one of the two sets of binary data B&W. The selected binary data is output to a printer Pr. It should be noted here that the saturation calculating unit 3 is only necessary to provide a certain value uniquely corresponding to the saturation value "c". For instance, it is satisfactory for the saturation calculating unit 3 to merely provide $(a^2+b^2)$. The decision unit 4 can compare this value to a threshold value, thereby shortening the operation (calculation for acquiring the root of $(a^2$ and $b^2)$ is omitted).

Figure 1A:
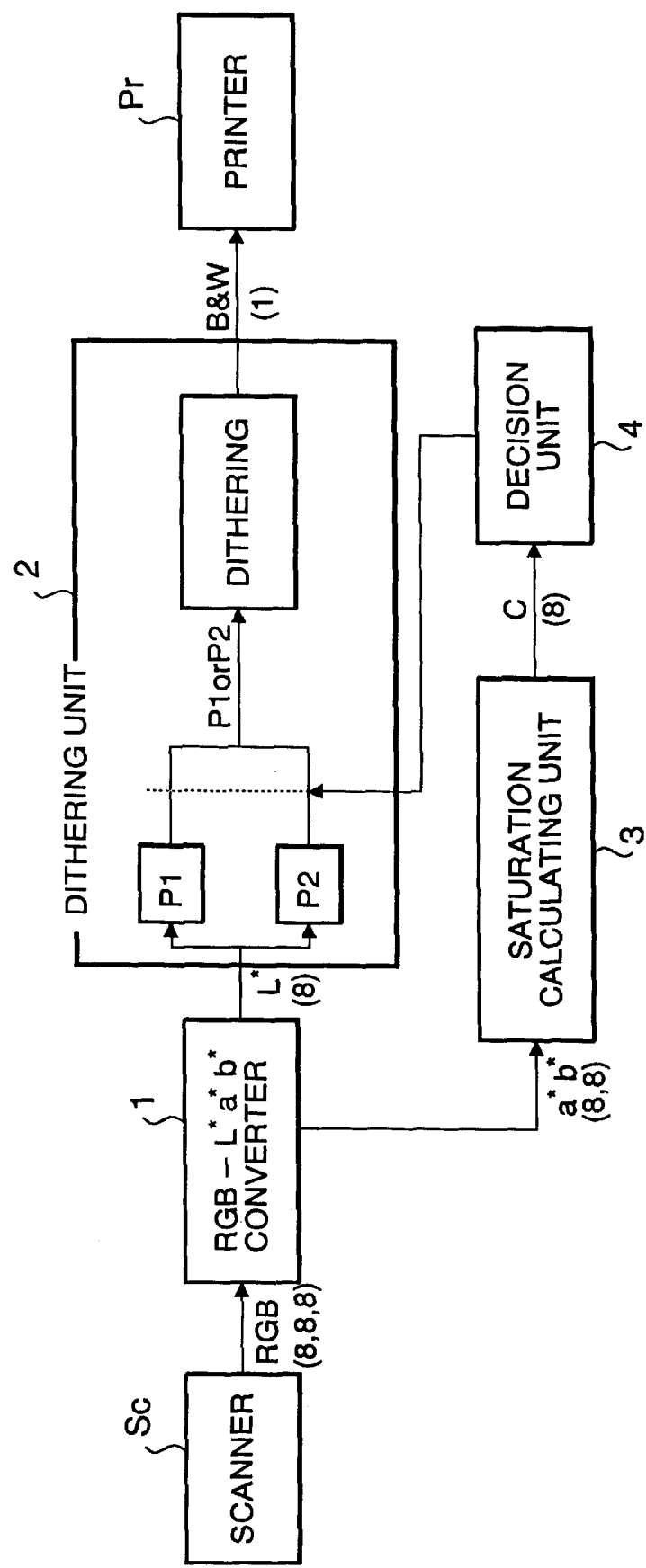
FIG. 1A illustrates another image processing device according to the present invention.
Figure 4:
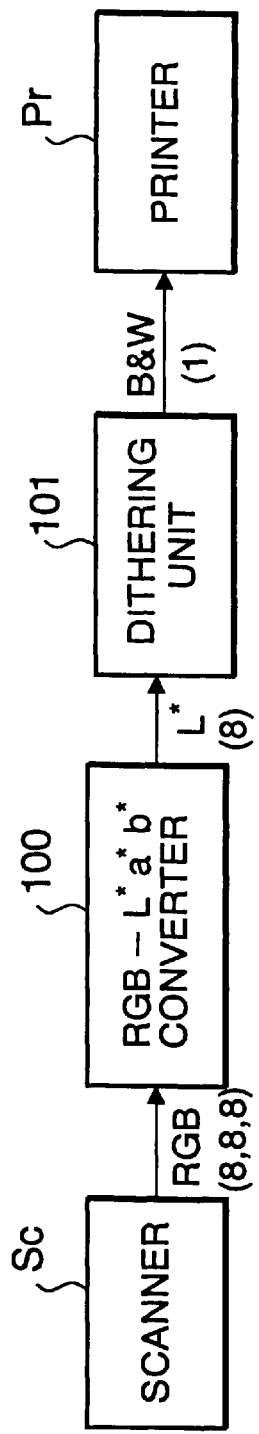
FIG. 4 is a diagram showing the order of operations for binary conversion of a color image in a conventional image processing device.

The present embodiment thus uses the saturation "c" as a parameter to select an appropriate set of data from two candidates. The printer Pr prints the selected black-and-white image. Since the image to be printed is determined based on the saturation, the original color image is converted into a binary image that does not look unnatural to the eye. It should be noted that only two dither patterns P1, P2, are utilized in the illustrated embodiment, but three or more dither patterns may be used for the binary conversion in the dithering unit 2. Further, it is also possible to select one dither pattern before the dithering process and to output only one binary image from the dithering unit 2. This modification is illustrated in FIG. 1A. As depicted, the data from the decision unit 4 is fed to the dithering unit 2, the dither pattern P1 or P2 is selected based on the data from the decision unit 4, and the dithering process is performed with the selected dither pattern. A single binary image B&W is output to the printer Pr from the dithering unit 2.

It should also be noted that the color image of the present embodiment has been represented according to a Lab color system, but other color systems like XYZ (Yxy) can be used as well. The binary image converted by the image processing device of the present embodiment is also suitable, in addition to being output by printer Pr, for being displayed on an LCD or CRT display.

Next, the selection of the dither pattern P1, P2 based on the saturation-based data determined by the decision unit 4 will be described in reference to FIGS. 2A to 2C and 3A to 3C.

Generally, a dithering process is applied to each of small matrices in a single original image. In the following description, one of such matrices is focused.

The dither pattern P1 (FIG. 2B) is used to create a scattered distribution of black pixels inside the binary pixel matrix of the selected area of the image when the saturation value "c" is high since a high saturation value means the color appears vividly. When the saturation value "c" is low, on the other hand, the dither pattern P2 (FIG. 3B) is employed to create a dense distribution of black pixels inside the matrix of binary data, since a low saturation value "c" represents a dark color. In the embodiment shown in FIG. 1, the decision unit 4 and selecting unit 5 in combination decide between the two patterns based on the specified threshold level.

The dithering process conducted inside the dithering unit 2 when a vivid color area of original image is converted to a binary image is illustrated in FIGS. 2A to 2C and that when a dark color area is converted is illustrated in FIGS. 3A to 3C. The dot matrix Dm (a 4×4 pixel grid) shown in FIG. 2A or 3A which is comprised of multi-bit pixel data Pd for the lightness L of each pixel is compared to the dither pattern P1 (FIG. 2B) or P2 (FIG. 3B). The dither pattern is a matrix of threshold values to determine whether each of the pixels of the original color matrix Dm should be converted to black or white in the binary conversion. The dither pattern value (or threshold value) is compared with the lightness value L of the original color data Pd, and if the former is smaller than the latter, that pixel Pd is turned to 1 (Pdb or black). Otherwise, the pixel is turned to 0 (Pdw or white). FIGS. 2C and 3C illustrate the resultant matrices Dm1, Dm2 composed of binary data Pdb and Pdw.

The dither patterns P1 and P2 are, of course, not limited to the patterns shown in FIGS. 2B and 3B. For example, how the threshold values are dispersed or distributed in the dither pattern P1/P2 may not be changed, but the threshold values themselves may be changed; for instance, if the matrix Dm of the original color image includes pixel data Pd with very high saturation values "c", the threshold values in the dither pattern P1 are increased respectively. By raising each threshold value in the dither pattern P1, the resulting binary image Dm1 includes more white pixels Pdw.

The present embodiment may be modified as follows: the selection of dither patterns P1, P2 based on the saturation value "c" as described above is executed only when the lightness level (total value or average) L of two neighboring areas of the original image to be converted to binary format are equal. Such an embodiment might be implemented because the eye particularly perceives the difference when the two continuous areas of the original image have the same lightness L but different chromaticities (saturations "c"). As described earlier, if these areas are converted to binary images based on only the lightness, the acquired binary images are the same black-and-white images. These looks unnatural. Therefore, the saturation "c" should be used in the binary conversion to output a natural looking binary image.

For instance, when two neighboring matrices Dm in the original color image have the equal total lightness value, the saturation "c" is considered in selecting the dither pattern P1 or P2. In this modification, only one dither pattern is provided from the beginning of the dithering process if the total lightness of a matrix Dm is not equal to that of an adjacent matrix Dm. In order to have the total lightness of the matrix Dm, the RGB-Lab converter 1 calculates the sum of the lightness values L for the pixel data Pd of each of the matrices Dm. When the total lightness level of the neighboring matrices are equal, the saturation calculating unit 3 selects one of the dither patterns P1, P2 based upon the calculated saturation value "c". It should be noted that the neighboring matrices Dm are not limited to two matrices located in the scanning direction. Since there are eight matrices (i.e., the one above, the one below, the right one, the left one . . . ) around a certain matrix Dm, arbitrary one or more adjacent matrices among these eight matrices may be considered as its neighboring matrices.

Considering the lightness values L of all the peripheral matrices, however, requires temporary memory for storage of these data, so comparing the lightness values L of the left and right matrices or just one of these matrices is more practical. The 4×4 matrix Dm would only require a memory to store 4 lines (scanning lines) of data.

Further, in order to further simplify the selection of either of the dither patterns P1, P2, the neighboring areas are selected from the same scanning line. For example, a total lightness of predetermined number of dots (e.g., four dots) on a particular scanning line is compared with that of next four dots on the same scanning line to determine whether or not the dither pattern selection based on the saturation "c" is needed.

The embodiments described above utilize only the saturation as the dither pattern determining parameter, but hue or a combination of hue and saturation can be used as well.

What is claimed is:

1. An image processing device which converts a color image into a binary image using a dither pattern, the color image consisting of a plurality of areas, the image processing device comprising:

dither pattern supply means for providing a plurality of dither patterns if lightness of a first area in the color image is equal to that of a second area adjacent to the first area;

first selection means for selecting a first dither pattern from the plurality of dither patterns based on saturation and/or hue of the first area;

second selection means for selecting a second dither pattern from the plurality of dither patterns based on saturation and/or hue of the second area;

first conversion means for performing binary conversion to the first area using the first dither pattern; and second conversion means for performing binary conversion to the second area using the second dither pattern.

2. The image processing device of claim 1, wherein the first area and the second area are on the same scanning line.

3. The image processing device of claim 1, wherein the second area is located above, below, right of, left of, diagonally upper right, diagonally upper left, diagonally lower right or diagonally lower left of the first area.

4. The image processing device of claim 1, wherein the first area and the second area are located in the same scanning direction.

5. The image processing device of claim 1 further including first determination means for determining the lightness of the first area and that of the second area, second determination means for determining whether the lightness of the first area is equal to that of the second area, third determination means for determining the saturation and/or hue of the first area and fourth determination means for determining the saturation and/or hue of the second area.

6. The image processing device of claim 5, wherein the first determination means numerically provides the lightness of the first area and that of the second area, the third determination means numerically provides the saturation and/or hue of the first area and the fourth determination means numerically provides the saturation and/or hue of the second area.

7. The image processing device of claim 1, wherein the image processing device is a facsimile machine or photocopier.

8. An image processing device which converts a color image into a binary image using a dither pattern, the color image consisting of a plurality of areas, the image processing device comprising:

a scanner for scanning the color image to determine lightness and chromaticity of a first area in the color image, and lightness and chromaticity of a second area in the color image adjacent to the first area;

means for determining whether the lightness of the first area is equal to that of the second area;

dither pattern supply means for providing a plurality of dither patterns if the lightness of the first area is equal to that of the second area;

a first dithering unit for applying a dither process to the first area using the plurality of dither patterns respectively, thereby providing a plurality of first binary images;

a second dithering unit for applying a dither process to the second area using the plurality of dither patterns respectively, thereby providing a plurality of second binary images;

first selection means for selecting one first binary image from the plurality of first binary images based on the chromaticity of the first area; and second selection means for selecting one second binary image from the plurality of second binary images based on the chromaticity of the second area.

9. An image processing method for converting a color image into a binary image using a dither pattern, the color image consisting of a plurality of areas, the image processing method comprising the steps of:

A) providing a plurality of dither patterns if lightness of a first area in the color image is equal to that of a second area adjacent to the first area;

B) selecting a first dither pattern from the plurality of dither patterns based on saturation and/or hue of the first area;

C) selecting a second dither pattern from the plurality of dither patterns based on saturation and/or hue of the second area;

D) performing binary conversion to the first area using the first dither pattern; and E) performing binary conversion to the second area using the second dither pattern.

10. The image processing method of claim 9, wherein the first area and the second area are on the same scanning line.

11. The image processing method of claim 9, wherein the second area is located above, below, right of, left of, diagonally upper right, diagonally upper left, diagonally lower right or diagonally lower left of the first area.

12. The image processing method of claim 9, wherein the first area and the second area are located in the same scanning direction.

13. The image processing method of claim 9 further including the steps of:

F) determining the lightness of the first area;

G) determining the lightness of the second area;

H) determining whether the lightness of the first area is equal to that of the second area;

I) determining the saturation and/or hue of the first area; and

J) determining the saturation and/or hue of the second area.

14. The image processing method of claim 13, wherein the step F) numerically provides the lightness of the first area, the step G) numerically provides the lightness of the second area, the step I) numerically provides the saturation and/or hue of the first area and the step J) numerically provides the saturation and/or hue of the second area.

15. An image processing method for converting a color image into a binary image using a dither pattern, the color image consisting of a plurality of areas, the image processing method comprising the steps of:

scanning the color image to determine lightness and chromaticity of a first area in the color image, and lightness and chromaticity of a second area in the color image adjacent to the first area;

determining whether the lightness of the first area is equal to that of the second area;

providing a plurality of dither patterns if the lightness of the first area is equal to that of the second area;

applying a dither process to the first area using the plurality of dither patterns, thereby providing a plurality of first binary images;

applying a dither process to the second area using the plurality of dither patterns, thereby providing a plurality of second binary images;

selecting one first binary image from the plurality of first binary images based on the chromaticity of the first area; and selecting one second binary image from the plurality of second binary images based on the chromaticity of the second area.

* * * * *